Figure 1:
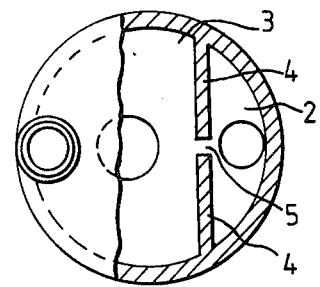

United States Patent [19]

Millar et al.

[11] Patent Number: 4,476,719
[45] Date of Patent: Oct. 16, 1984

[54] LIQUID MEASURING DEVICES

[75] Inventors: Thomas D. Millar; Dougald S. M. Phillips, both of Hamilton, New Zealand

[73] Assignee: AHI Operations Limited, Manukau, New Zealand

[21] Appl. No.: 377,425

[22] Filed: May 12, 1982

[30] Foreign Application Priority Data

May 12, 1981 [NZ] New Zealand .................. 197066

[51] Int. Cl.³ .............................................. G01F 1/20
[52] U.S. Cl. ........................................ 73/200; 73/215
[58] Field of Search ................. 73/215, 304 R, 200

[56] References Cited

U.S. PATENT DOCUMENTS

| 3,392,580 | 7/1968 | Bain et al. ............... | 73/215 |
| 3,465,588 | 9/1969 | Slavin ..................... | 73/304 |
| 3,527,251 | 9/1970 | Hagstrom et al. ....... | 73/215 X |
| 3,871,230 | 3/1975 | Dye et al. ................ | 73/215 |
| 4,229,972 | 10/1980 | Phillips et al. .......... | 73/204 |
| 4,346,596 | 8/1982 | Diamant et al. ......... | 73/215 X |

FOREIGN PATENT DOCUMENTS

| 2447261 | 4/1976 | Fed. Rep. of Germany ........ | 73/215 |
| 288725 | 4/1928 | United Kingdom .................. | 73/215 |

Primary Examiner—Herbert Goldstein
Attorney, Agent, or Firm—Holman & Stern

[57] ABSTRACT

A method and apparatus for measuring flow and/or volume of a liquid preferably milk in which the milk is passed from a passageway (3,56) through a gap (5,46) which is long vertically but narrow in width so that a pool is formed in the passageway, the height of milk in the pool being a measure of the rate of flow of the milk. The levels maintained over predetermined intervals of time are integrated to give volume measurements. Measurements of levels are made by providing a resistor (8,32) in the passageway (3,56) so that the impedance is changed according to the liquid level and measuring such impedance.

9 Claims, 6 Drawing Figures

LIQUID MEASURING DEVICES

This invention relates to liquid measuring devices and has been devised particularly though not solely for use as a "milk meter" that is to say a device which will measure the flow and quantity of milk received from individual cows in a herd.

It is an object of the present invention to provide a liquid measuring device which will at least provide the public with a useful choice.

Accordingly in one aspect the invention consists in a method of measuring flow and/or volume of liquid and said method comprising the steps of causing the liquid to be measured to flow through a gap of narrow width but long vertically in use so that a pool of liquid is maintained on the upstream side of the gap such that the level of liquid in the pool is an indication of the rate of flow through the gap and indicating and/or recording that rate of flow by measuring the height above a datum of said level of liquid in the pool.

In a further aspect the invention consists in apparatus for measuring liquid flow and/or volume said apparatus comprising a passageway through which the liquid to be measured flows and a gap of narrow width but long vertically in use in said passageway such that in use a pool of liquid is maintained on the upstream side of said gap and measuring means for measuring the level of liquid on the upstream side of said gap which level indicates the rate of flow of liquid.

To those skilled in the art to which this invention relates, many changes in construction and widely differing embodiments and applications of the invention will suggest themselves without departing from the scope of the invention as defined in the appended claims. The disclosures and the descriptions herein are purely illustrative and it is not our intention to limit the scope of the invention by those disclosures and descriptions, or otherwise, than by the terms of the appended claims.

The invention consists in the foregoing and also envisages constructions of which the following gives examples only.

Figure 2:
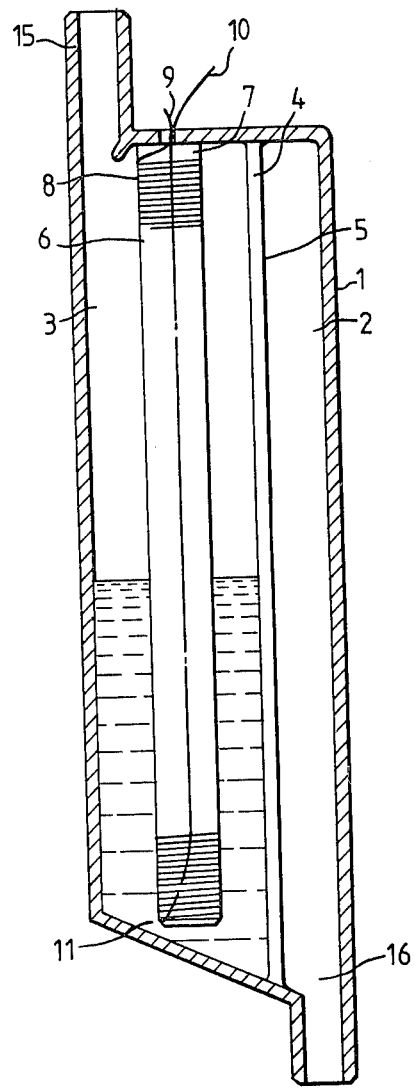
Figure 3:
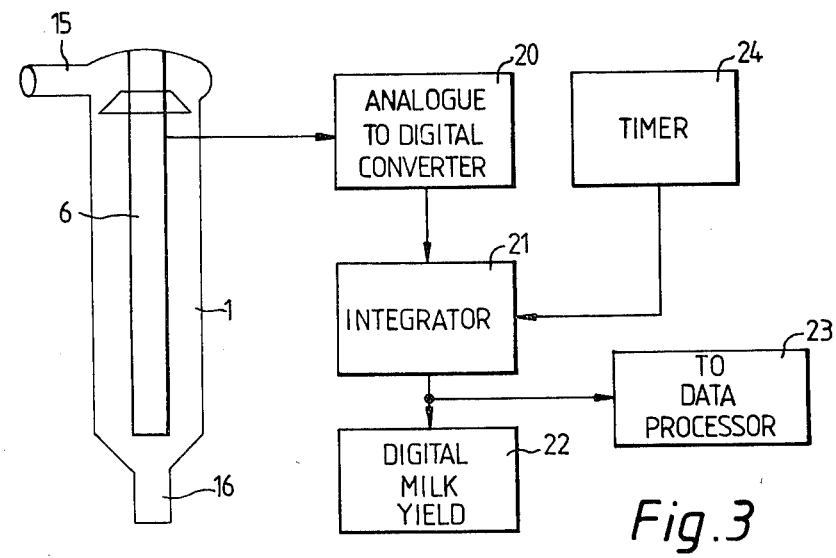

One preferred form of the invention and modifications thereof will now be described with reference to the accompanying drawings in which, FIG. 1 is a plan view partly in section of apparatus according to the invention, FIG. 2 is a cross section on the line II—II FIG. 1, FIG. 3 is a flow diagram of indicating and recording apparatus for use with the invention.

Figure 5:
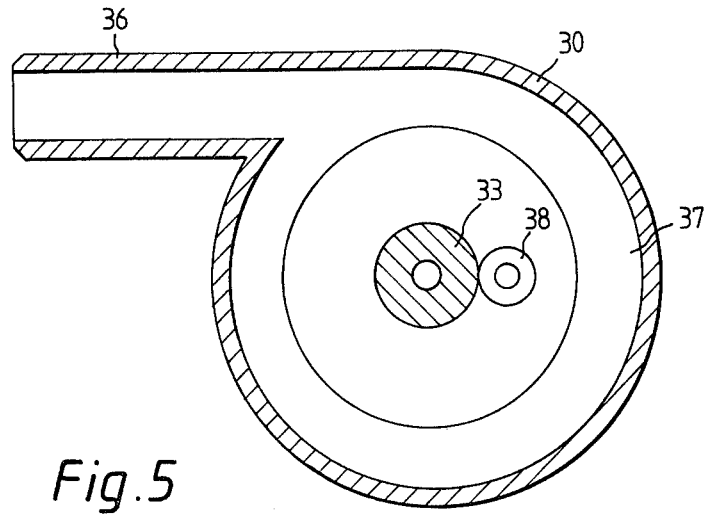
Figure 6:
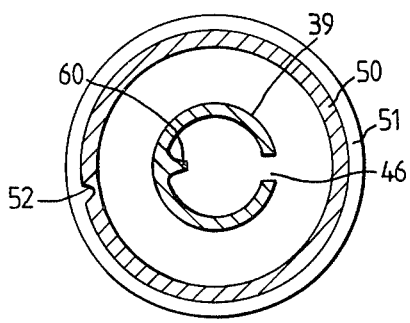
Figure 4:
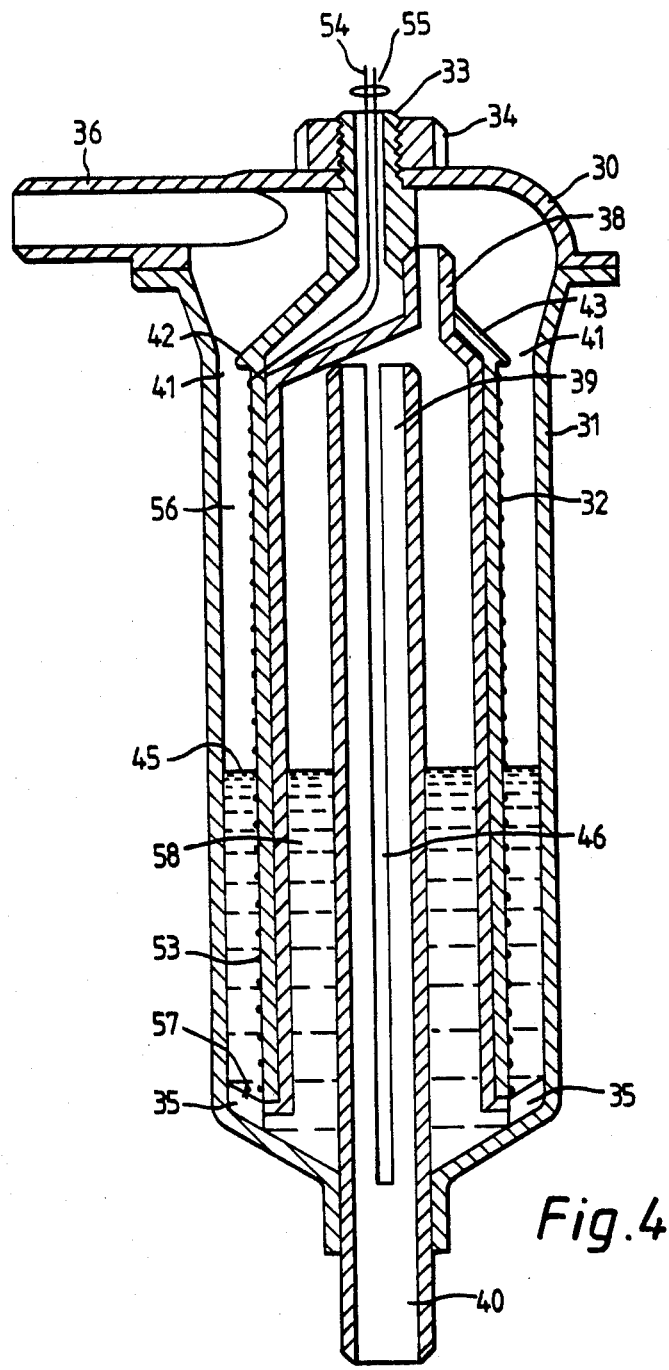

FIG. 4 is a cross section through a modified form of apparatus according to the invention, FIGS. 5 and 6 are cross sectional views of parts of the apparatus shown in FIG. 4.

Referring to FIGS. 1 and 2 of the drawings a body 1 is made to provide a passageway having two chambers 2 and 3 separated by a dividing wall 4 the dividing wall having a narrow gap 5 which is long vertically and in fact preferably vertical though it could be of other forms e.g. helical. The only communication between the chambers 2 and 3 is through the gap 5. A depth measuring electrode 6 comprises a rod 7 carrying a resistor 8 having terminals 9 and 10 the terminal 10 being connected to the bottom of the resistance at 11. Chamber 3 is connected to an inlet 15 and chamber 2 is connected to an outlet 16. Since the flow from inlet 15 to outlet 16 must be through the gap 5, as the flow increases so the level of liquid in chamber 3 will increase and cover a greater or lesser amount of the resistance 8. This will cause a variation in impedance looked at from the terminals 9 and 10. These terminals are connected to an analogue to digital converter 20 (FIG. 3) which in turn is connected to an integrator 21 and through the integrator to a digital milk yield indicator 22 and if desired to a data processor 23. A timer 24 is also connected to the integrator so that at timed intervals the level of milk in the chamber 3 can be measured as will be explained further later.

In the preferred form of the invention the inlet 15 connects the chamber 3 to the milking cluster of a milking machine and the outlet 16 is connected to the milk line of the milking installation. Thus when milking is in progress milk will enter the chamber 3 through port 15 and flow through the gap 5 to the chamber 2 and thence out through the outlet 16 to the milk line.

The gap 5 is narrow in relation to the ports 15 and 16 and in relation to the chambers 2 and 3. The actual dimension of the gap is adjusted to suit the length of the body and the milk flow rate so that it will offer resistance to the flow of milk from the chamber 3 to the chamber 2. Thus the milk level in chamber 3 will rise until enough area of gap 5 is available to handle the milk flow at any instant thus forming a pool of milk in chamber 3, the particular level depending on the inflow of milk through inlet 15. The resistor depth signal indicated by the change of impedance between terminals 9 and 10 is changed to give a digital readout by normal electronics in analogue to digital converter 20. The instantaneous digitised flow rate is read by the integrator 21 on command from the timer 24 and the flow reading for each interval of time is added to previous readings from the same milking. The sum of the interval flow readings will indicate the total milk yield within reasonable tolerances. It will be apparent that the device will require calibrating to give this but that is a matter of recording particular levels and calibrating the volume which will flow through the gap 5 at that level for the interval or intervals of time set by the timer 24. Such intervals may be varied during milking to improve accuracy.

FIG. 4 shows an alternative construction with the integers arranged concentrically which gives several advantages. The head 30 on the body 31 supports the depth measuring element 32 by means of a threaded neck 33 and a nut 34. The lower end of the element 32 is supported and located by a plurality for example four ribs 35.

A tangential inlet port 36 accepts milk from the milking cluster and directs the milk so that it flows peripherally around the inside of upper curved surface 37 of the head 30. Because of centrifugal forces set up by this vortex-like flow milk in the milk air mixture from the cluster will move to the outside of the vortex displacing the air component of the mixture inwardly. The air is thus largely separated from the milk and the frothing likelihood of the milk is thus reduced. The air so separated will then flow through the port 38 leading to the tube 39 and then downwardly to the outlet port 40. The milk collecting in the head 30 will then under the influence of gravitational forces, flow through the annular gap 41 between a lip 42 and the inside surface of the body 31. Milk in contact with the inside surface of the head 30 will tend to flow down the inside surface of the body 31 while milk which falls onto the conical upper surface 43 of the sleeve 42 will be directed outwardly to join the milk flow through the gap 41. Thus the depth sensing surface of element 32 will in most instances be kept free of milk contact except where it is submerged below the milk surface 45 of the pool of milk which forms. The milk will then flow through the gap 46 which corresponds to the gap 5 in the construction shown in FIG. 1. The depth measuring element is composed of two concentric cylinders 50 and 51. A shallow lengthwise groove 52 in the outer surface of cylinder 50 serves as a conduit for the wire connection to the lower end of the depth sensing element 53. This leads to terminals 54 and 55 which correspond to the terminals 8 and 9 in FIG. 1. A rib or vane 60 is provided to obviate or minimize rotary flow or swirling in the tube 39.

Milk flows down the inside surface of body 31 chamber 56 and through a gap 57 between the lower outer surface of element 51 to chamber 58 and thence through the gap 46 into the tube 39 and the outlet 49. The gap 57 may be made small to act as a surge suppressor and froth trap. As the milk level in the chambers 56 and 58 changes due to the changes in milk flow and as a result of the flow resistance offered by the gap 46 any froth will tend to collect on top of the milk surface so the milk flow through the metering gap 46 is largely unaffected by froth. The depth measuring element is also largely unaffected by froth so this results in a precise flow indication.

It will be readily understood that the digital signals from the analogue digital converter may simply be used as an input to a pulsation programming system and also to initiate cluster or teat cup removal. Thus the pulsation programming can be modified by varying rate and ratio to suit the milk yield to give the optimum or close to the optimum milking action. Similarly when the milk flow reduces to a predetermined level an actuator is triggered by the milk yield device 22 to cause action of a teat cup withdrawal mechanism such as the mechanism at present manufactured by the applicant company.

The invention supplies an apparatus which meets an important requirement of the milk producing industry, namely that the output of individual beasts be measured and recorded as a necessary production record as well as an aid to the selection of breeding stock. Many types of meters have been manufactured and used these have included full yield collecting devices for example recording jars which retain the full output of an animal so that an indication of the total yield may be obtained. Such devices are cumbersome, occupy too much space in the milking parlour, are difficult to read accurately and must be exactly perpendicular for the calibrations to be accurate.

Full flow mechanical devices have been proposed which measure or "count" the milk yield by tipping tray or motorised ladle devices. Such devices may be adversely effected by mechanical friction by the cumulative effect of any small volumetric error in the measuring components and by spillage or leakage so that small quantities of the milk may not in fact be measured.

Proportional sampling meters have been made which divide off a proportion (typically 2% or 2½%) of the milk yield and divert this sample to a measuring flask which is calibrated to indicate the total yield. Such devices suffer from a loss in accuracy as a result of small variations in the sampling ports and/or from flow conditions through the meter which may affect sampling accuracy. The error may be further compounded by variations in sample flask volume or calibration.

It is also often required that a small 10 to 20 ml sample of milk which is still proportionally representative of the full milk yield be taken for analysis as to fat protein or other analysis.

The present invention at least in the preferred form has the following advantages over the foregoing prior art devices.
1. It is of small size.
2. It is of simple construction and has no valves or moving parts.
3. It gives full flow capacity and does not depend on the dividing off of a proportional sample and accordingly presents little obstruction to flow.
4. The device is self-emptying.
5. The device will "wash in place" by normal machine washing procedures.
6. Milk is always in motion through the meter so that it does not hold up to lose heat and suffer a change in conductivity as a result.
7. Although conductivity is affected by fat percentage this is probably partly offset by the increased viscosity of high fat percentage milk because although high fat percentage reduces the conductivity thus indicating a lower level it increases the viscosity which holds a higher milk level in the meter. Thus these two effects tend to cancel out.
8. Gives a total yield indication by summarising the indicated values of milk flow rates on a regular basis say every few seconds or less the total is integrated to give the flow rate or total milk yield. The errors will be well within permissible tolerances.
9. In measuring the flow rate the measurement is most critical in the higher flow levels i.e. one to four liters per minute. This accounts for 80-90% of the total mean milk yield and this means the meter needs to have a high accuracy in this range only since the low flow rates at start and finish of milking are of little overall significance. The construction according to the invention provides considerable accuracy at the higher rate of flow and therefore gives good overall accuracy.

In the construction described in FIG. 4 milk froth collects outside the element or resistance which is in any event largely unaffected by froth where the collection of froth does not effect flow rate through the gap.
10. Linearity of output may be adjusted by altering the profile of the gap or slot. Calibration may be simply adjusted by varying the time interval of successive samples.
11. A small proportion of milk sample for analytical purposes may readily be obtained by a simple device which is the subject of a separate patent application.

The invention also assists in meeting a further need which is becoming of great importance to the milk producing industry. This is, with the advent of electronic data processing and the increasing use of EDP in farm management, animal feeding control, breeding records etc; for a milk metering device which will simply and accurately provide an electronic indication of an animal's total yield, as well as to monitor and/or record the yield-rate during the milking process.

Such an electronic output may be simply interfaced with a management or recording computor. As stated it may also be used to programme the pulsation rate, ratio or pressures throughout the milking as well as to initiate automatic cluster (teat-cups) removal when the milk flow rate has dropped to a pre-determined level.

What is claimed is:

1. Apparatus for measuring milk flow, said apparatus comprising an outer chamber having upper and lower parts and ranged substantially vertically in use, inlet milk flow directing means, including a curved surface and an inlet port directed tangentially to said curved surface, for separating air from inflowing milk by directing the inflowing milk from said inlet port into a spinning flow along said curved surface and then into said outer chamber, a cap closing off the upper part of said outer chamber, an intermediate tube having upper and lower open ends, said lower end being positioned in spaced proximity to said lower part of said outer chamber to provide an opening between said lower end and said lower part, an electrically resistive element mounted on said intermediate tube, a further internal tube having a gap of narrow width and long vertical length within said intermediate tube such that in use a pool of milk is maintained on the upstream side of said gap, said resistive element being positioned in said chamber to require the milk level at the upstream side of said gap to cover the part of the resistive element according to said milk level in a manner such that the impedence of the resistive element depends on said milk level, said impedence providing an indication of the level of liquid on said upstream side, and data processing means responsive to the impedence of said resistive element for providing information selected from indication and recordal of milk flow rate and milk yield according to the milk level at the upstream side of said gap.

2. Apparatus according to claim 1 further comprising recording means for measuring the level of the liquid at the upstream side of said gap and recording the measured levels at predetermined intervals of time.

3. Apparatus according to claim 2 wherein said recording means includes means responsive to said impedence for providing a signal representing volumetric flow of milk to said apparatus, and integrating means for integrating said signal during said intervals of time to provide a further signal representing total volume of liquid passing through said gap for a selected plurality of said periods of time.

4. Apparatus according to claims 1, 2, or 3 wherein said further internal tube is a hollow cylindrical body having a peripheral wall with said gap formed therein, and wherein said apparatus further includes an outlet leading from said body on the downstream side of said peripheral wall.

5. Apparatus according to claims 1, 2, or 3 wherein said gap is formed in a tube about which said outer chamber is provided, and further comprising an inlet to said outer chamber and an outlet from said tube.

6. Apparatus according to claim 5 wherein said resistive element comprises an insulative tube about which an electrically resistive member is provided.

7. Apparatus according to claim 6 wherein said resistive tube is hollow and has an inside and outside, said apparatus further comprising an air port provided in an upper part of said insulative tube between the inside and the outside of said insulative tube.

8. Apparatus for measuring milk flow, said apparatus comprising a receiving chamber arranged substantially vertically in use and defined between two generally downwardly convergent walls, inlet milk flow directing means for directing milk into said receiving chamber and including a tangential inlet port and a curved surface, said tangential inlet port directing milk over said curved surface to assist in separation of air and milk, a stilling chamber disposed generally below said receiving chamber, a communicating passageway between said receiving chamber and said stilling chamber through which milk flows by gravity from said receiving chamber to form a pool of milk in said stilling chamber, said communicating passageway being defined as an opening between said two convergent walls, an outlet from said stilling chamber, said outlet comprising a gap of narrow width but long vertical length such that the rate of outflow through said gap is indicative of the level of milk in said stilling chamber, a resistive element having terminals, said resistive element being positioned such that the level of milk on the upstream side of said gap covers part of the resistor and the impedance appearing at the terminals of the resistor depends on the level of milk in the stilling chamber, and means for measuring such impedance.

9. Apparatus according to claim 8 including data processing means connected to said terminals for providing information selected from indication and recordal of milk flow rate and milk yield according to the level of milk in the upstream side of said gap.

* * * * *